United States Patent [19]

Kirk, Jr. et al.

[11] 3,917,557

[45] *Nov. 4, 1975

[54] METHOD FOR TREATING CRACKED GAS OIL

[75] Inventors: Merritt C. Kirk, Jr., Thornton, Pa.; Craig R. Andersson, East Liverpool, Ohio

[73] Assignee: Sun Ventures, Inc., St. Davids, Pa.

[ * ] Notice: The portion of the term of this patent subsequent to Apr. 8, 1986, has been disclaimed.

[22] Filed: Nov. 20, 1973

[21] Appl. No.: 417,662

Related U.S. Application Data

[63] Continuation of Ser. No. 777,244, Nov. 20, 1968, abandoned, which is a continuation of Ser. No. 627,887, April 3, 1967, abandoned.

[52] U.S. Cl. .......................... 260/33.6 UA; 260/668
[51] Int. Cl. ...................... C08f 45/28; C07c 15/24
[58] Field of Search ................. 260/33.6 UA, 668 B

[56] References Cited
UNITED STATES PATENTS

| | | | |
|---|---|---|---|
| 2,510,009 | 5/1950 | Bruins et al. | 260/33.6 UA |
| 3,082,182 | 5/1963 | Ford et al. | 260/33.6 UA |
| 3,437,702 | 4/1969 | Kirk, Jr. et al. | 260/33.6 UA |

*Primary Examiner*—Morris Liebman
*Assistant Examiner*—S. L. Fox
*Attorney, Agent, or Firm*—George L. Church; J. Edward Hess; Barry A. Bisson

[57] ABSTRACT

A concentrate of 2,6- and 2,7-dimethylnaphthalene (DMN) and a polyvinyl chloride (PVC) plasticizer is obtained from cracked gas oil (CGO) by alkylating the CGO with an olefin in the presence of an alkylation catalyst then distilling off a cut which will include the 2,6- and 2,7-DMN. In the alkylation, the other dialkylnaphthalenes which are normally difficult to separate from the 2,6- and 2,7-DMN are preferentially alkylated and end up as higher boiling materials of which a 600°–750°F. fraction is a PVC plasticizer. Thus, when a 495° to 510°F. fraction of the alkylation product is taken, it will be greatly enriched in the 2,6- and 2,7-DMN. For example, a 495°–508°F. CGO fraction is alkylated with a 50°–105°F. fraction of catalytic gasoline which contains 60% $C_5$-olefins in the presence of a $BF_3/H_3PO_4$ catalyst. The charge contained a total of 67.3% DMN (15.5% 2,6- and 14.9% 2,7-DMN) and the 495°–508°F. fraction of the alkylation product contained 52.3% total DMN (26.2% 2,6- and 25.7-DMN). This concentrate is then subjected to a further purification such as liquid extraction followed by neat crystallization. The heavy alkylated material (600°–750°F.) is a good PVC plasticizer.

13 Claims, 1 Drawing Figure

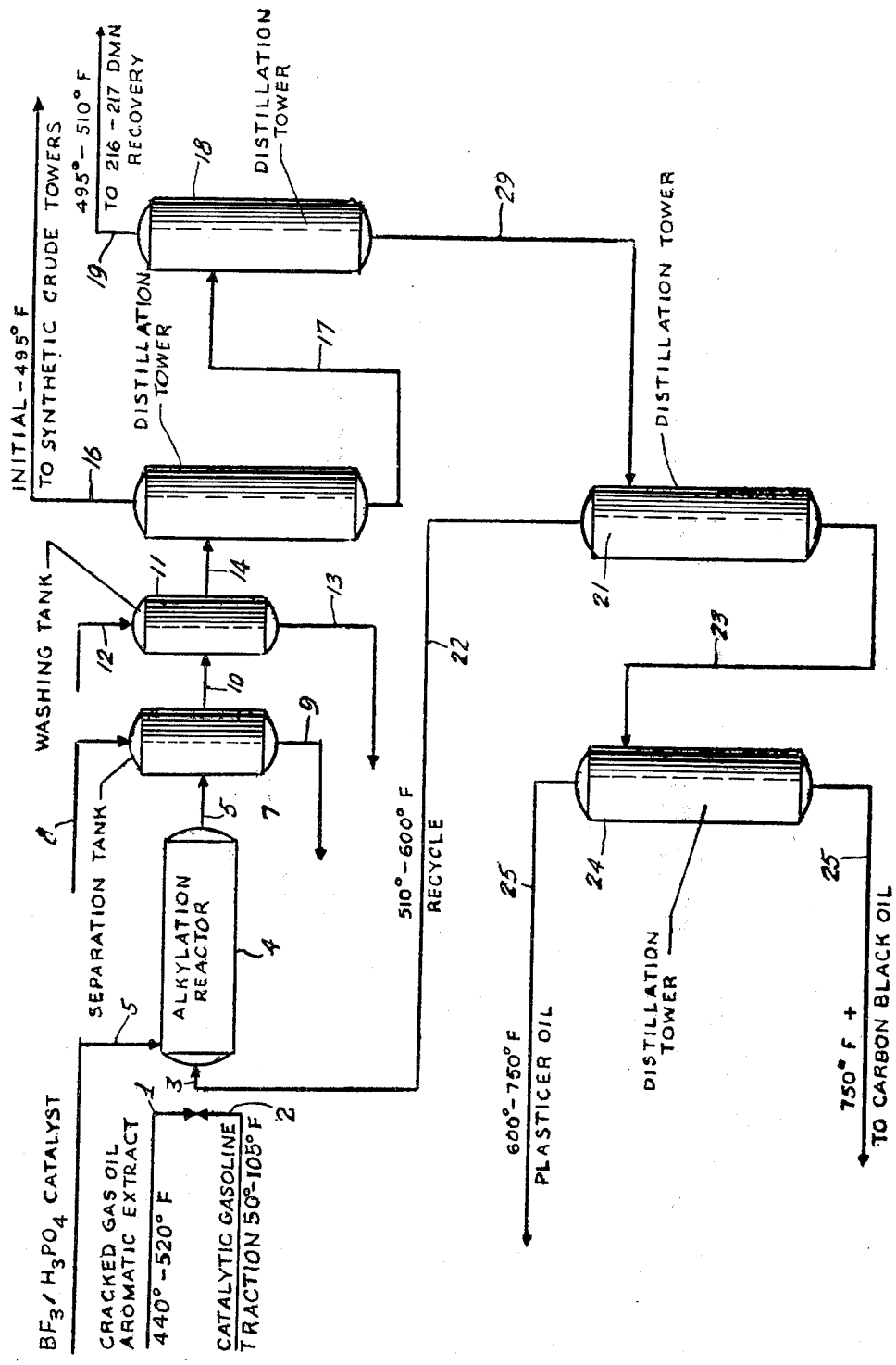

METHOD FOR TREATING CRACKED GAS OIL

This is a continuation of application Ser. No. 777,244 filed Nov. 20, 1968, now abandoned, which is a continuation of Ser. No. 627,887, filed Apr. 3, 1967, now abandoned.

BACKGROUND OF THE INVENTION

Concentration of 2,6- and 2,7-dimethylnaphthalene is required prior to separation and purification. 2,6-and 2,7-dimethylnaphthalene is normally derived from a cracked gas oil (CGO) fraction boiling in the range of 400°–650°F. which contains mono-, di- and trialkyl naphthalene constituents.

The synthetic fiber and film market has achieved significant importance in the commercial world. One of the more important materials from which such fibers are made and which has generated a great deal of interest is the polyester of 2,6-dicarboxynaphthalene. Similarly, interest has developed in polyesters prepared from the 2,7-dicarboxynaphthalene. Thus, 2,6- and 2,7-dimethylnaphthalene have become important precursors for oxidation to prepare the corresponding dicarboxylic acids. The principal source of these two isomers is cracked gas oil derived from petroleum. However, it has been very difficult to separate 2,6- and 2,7-dimethylnaphthalene from the cracked gas oil fraction. The separation can be simplified by concentrating these two materials initially. Subsequent highly refined separations are then more effective at producing substantially pure isomers.

Some of the methods used for purifying the 2,6-and 2,7-dimethylnaphthalene are neat crystallization such as that shown in U.S. Pat. No. 3,207,726 to Malmberg et al.; azeotropic distillation as shown in U.S. Pat. No. 3,171,794 to Wynkoop et al. and extraction-azeotropic distillation as shown in U.S. Pat. No. 3,171,863 to Wynkoop et al.

A related problem has been to find a utility for the by-product, that is, the remaining portion of cracked gas oil from which the 2,6- and 2,7-isomers are removed. Generally it has been most expedient to return this by-product to the catalytic gas oil stream of its origin. However, it has been found to be economically more desirable to further separate the cracked gas oil stream into fractions which have different and more valuable properties because of the alkylation.

One of the present by-products is a polyvinyl chloride plasticizer. There is considerable interest in polyvinyl chloride oil plasticizers. Work to date has been directed mainly toward tailoring existing refinery streams such as heavy aromatic extracts from catalytic cracking operations for PVC plasticizers. These oils, however, are characterized by poor color stability in the presence of sunlight. The oils of the present invention have very good ultraviolet stability.

The process of the present invention can be used alone as a means of concentration and purification or more preferably in combination with subsequent purifications to achieve a high degree of 2,6- and 2,7-DMN purity.

SUMMARY OF THE INVENTION

The present invention involves concentration of 2,6- and 2,7-dimethylnaphthalene from a mixture of petroleum hydrocarbons wherein the mixture is contacted with an olefinic material in the presence of an alkylation catalyst and the recovery of an alkylated fraction which is a polyvinyl chloride plasticizer. In one embodiment, materials other than 2,6- and 2,7-dimethylnaphthalene are preferentially alkylated so that upon fractionation of the resulting alkylated mixture, a fraction having the same boiling range as the charge will have a higher concentration of the 2,6- and 2,7-dimethylnaphthalene than the charge. The dimethylnaphthalenes which have been alkylated remain behind as a high boiling fraction. In another embodiment, a narrower distillation cut is taken than the original charge. Preferably, this narrow cut will be in the range of 495° to 510°F. A high boiling fraction from the alkylation which is composed principally of alkylnaphthalenes makes an excellent plasticizer oil for polyvinyl chloride.

DRAWING

The drawing is a schematic flow diagram of the alkylation and subsequent separation of the alkylated fractions.

DESCRIPTION OF THE INVENTION

The charge material used in the present invention is obtained as a cracked gas oil fraction boiling in the range of 400°–650°F. which contains mono-, di- and trialkylnaphthalene constituents. Within this definition of starting material are included cracked gas oils as obtained directly from distillation of cracking products such as gas oils having an initial boiling point not substantially lower than 400°F. and a final boiling point not substantially higher than 650°F.; mixed aromatic concentrates obtained from such cracked gas oils and having a boiling range substantially the same as the starting cracked gas oil; and fractions separated from either of the above materials but which boil within the narrower range of 440°–520°F. preferably 480°–515°F. As used herein, the term "cracked" includes thermal, catalytic and reforming operations.

According to the present invention, the cracked petroleum fraction should contain substantial amounts of dicyclic aromatic compounds and preferably little if any tricyclic compounds. Since the petroleum fraction can be derived from any source of crude petroleum, its specific composition can vary considerably. Thus, even though the boiling range of the petroleum fraction can be between 400° and 650°F., it is preferable that the boiling range be substantially between 440° and 520°F. and more preferably between 480°–515°F. so that a concentrate of such dicyclic compounds as dimethylnaphthalene (DMN) can be obtained. Usually suitable charge materials within the definition of cracked gas oils will typically have an API gravity at 60°F. between 12° and 40°; a refractive index at 20°C. of from 1.4500 to 1.5800 and a sulfur content of from 0.5% by weight to 3.0% by weight.

A preferred CGO fraction is a dicyclic aromatic concentration. The concentrate is derived from a cracked gas oil fraction boiling mainly in the range of 440°–515°F. This fraction is first countercurrently extracted with a furfural solvent. The extract phase is first diluted with additional furfural and then treated with a $C_5$–$C_8$ saturated hydrocarbon such as hexane. The extract phase is then stripped of furfural and hexane. The remaining concentrate has a very high dicyclic aromatic content. A detailed description of this process is not necessary since the process is fully described in U.S. Pat. No. 3,172,919 issued Mar. 9, 1965, to Hagerty et al.

The concentrate will contain essentially 100% of the dicyclic aromatics, less than 50% of the monocyclic aromatics and essentially none of the non-aromatics of the CGO stream. This preferred CGO fraction will contain at least 75 wt. % dicyclic aromatics, up to 100 wt. % but in practice, the upper dicyclic aromatic content will be about 87–90 wt. %.

The olefinic material employed to alkylate a petroleum hydrocarbon fraction is a $C_3$ to $C_8$ olefin, a mixture of these olefins or a hydrocarbon fraction such as a 50°–105°F. fraction of catalytic gasoline. Preferred and particularly effective are olefins which can produce tertiary carbonium ions, i.e., isobutylene. When a hydrocarbon mixture containing olefins is employed as the alkylating agent, it should contain at least 5 wt. percent olefins. The examples presented herein were performed using a $C_5$ fraction of catalytic gasoline boiling in the range of 50°–105°F. and containing about 60% olefins weight.

The olefinic material is contacted with the charge material under alkylating conditions in the presence of an alkylation catalyst. A temperature of 0° to 600°F., pressure of 15 to 1500 p.s.i.a. and residence time of 5 seconds to 300 minutes is suitable depending to some degree on the particular alkylation catalyst employed, the heat transfer obtained and whether a vapor phase or liquid phase alkylation is used.

Any conventional alkylation catalysts can be used. These include hydrofluoric acid, phosphoric acid, sulfuric acid, Friedel-Crafts catalysts such as zinc chloride, aluminum chloride, ferric chloride, boron fluoride and the like and complexes of Friedel-Crafts catalysts with organic polar liquids such as nitrobenzene, chloroform and nitromethane. The catalyst can be unsupported or supported such as $H_3PO_4$ on Kieselguhr. An active catalyst in the alkylation is boron trifluoride and phosphoric acid.

The polyvinyl chloride plasticizer is the alkylated fraction boiling between 600° and 750°F. and preferably between 650° and 720°F.

Referring now to the drawing which is a schematic representation of an alkylation and separation of the alkylated products, a dicyclic aromatic extract from cracked gas oil (87.7% dicyclic aromatics) having a boiling range of 440°–520°F. line 1 is premixed with a $C_5$ catalytic gasoline fraction boiling in the range of 50°–105°F. from line 2 and passed through line 3 into the alkylation reactor 4 which contains $BF_3/H_3PO_4$ (0.2 to 1.7 mole ratio - saturation limit) added through line 5. The reactor is maintained at a temperature of about 60°F. and a reactant residence time of 1 minute. The alkylated mixture passes from reactor 4 through line 6 into separation tank 7 where water is added through line 8 to deactivate the catalyst. Water and catalyst are removed through line 9 and the product passes through line 10 into washing tank 11 where an aqueous solution of sodium bicarbonate is added through line 12 to wash the alkylated product. The wash solution is removed through line 13. The alkylate product passes through line 14 into distillation tower 15 where the material boiling below 495°F. is taken off and sent through line 16 to synthetic crude towers (not shown) for further processing. The bottoms from distillation column 15 are sent through line 17 to distillation tower 18 wherein the 2,6- and 2,7-DMN fraction is distilled off at 495°–510°F. and removed through line 19. This fraction contains about 50% 2,6- and 2,7-DMN of which 25–28% is 2,6- isomer and can be used in some polymerizations but more preferably is subject to further separations such as those shown in the previously mentioned U.S. patents, i.e., combined solvent extraction-azeotropic distillation, azeotropic distillation and neat crystallization. The bottoms from distillation tower 18 pass through line 20 to distillation tower 21 where the fraction boiling between 510° and 600°F. is recycled through line 22 to line 3 for further treatment in the alkylation reactor. The bottoms from distillation tower 21 pass through line 23 into distillation tower 24 where the material boiling between 600° and 750°F. is taken off through line 25. This material is an excellent plasticizer for PVC. The bottoms from distillation tower 24 are withdrawn through line 26 and are suitable carbon black oil blend stock.

EXAMPLES 1 and 2

Following a procedure such as set out above in the description of the drawing, a dicyclic aromatic concentrate, which was derived from CGO in accordance with the procedure of U.S. Pat. No. 3,172,919 discussed above, boiling in the range of 440° to 520°F. and a 495°–508°F. portion of this aromatic concentrate were each charged to the alkylation reactor using the $BF_3/H_3PO_4$ alkylation catalyst. Table I shows in weight percent the constitution of the charge prior to alkylation and the constitution of the alkylation product determined by vapor phase chromatography and infrared analysis. Table II shows the weight and volume of the charge and the products in terms of boiling ranges.

TABLE I

| EXAMPLE | Values in Weight Percent | | | |
|---|---|---|---|---|
| | 1 | | 2 | |
| | CHARGE 440–520°F. boiling range arom. conc. | PRODUCT 440–520°F. boiling range | CHARGE 495–508°F. cut of Ex.1 charge | PRODUCT 495–508°F. boiling range |
| VPC/IR: (wt. %) | | | | |
| naphthalene | 5.3 | 0 | 0 | — |
| methylnaphthalene | 27.5 | 3.8 | 4.8 | — |
| ethylnaphthalene | 4.1 | 0.4 | 6.6 | — |
| DMN (total) | 50.8 | 31.1 | 67.3 | 52.3 |
| 2,6-DMN | 9.8 | 14.1 | 15.5 | 26.2 |
| 2,7-DMN | 7.7 | 12.1 | 14.9 | 25.7 |
| other DMN isomers | 33.3 | 4.9 | 36.9 | .4 |
| $C_{12}+$ | 6.4 | 1.1 | 0.3 | — |
| other | 5.9 | 63.6* | 17.0 | 47.7** |
| 2,6-+2,7-DMN | | | | |
| total DMN % | 34.5 | 84.2 | 45.2 | 99.3 |
| ratio: | | | | |
| 2,6-DMN | | | | |
| 2,7-DMN | 1.27 | 1.17 | 1.04 | 1.02 |
| Total DMN | | | | |

TABLE I-continued

| EXAMPLE | Values in Weight Percent | | | |
|---|---|---|---|---|
| | 1 | | 2 | |
| | CHARGE 440–520°F. boiling range arom. conc. | PRODUCT 440–520°F. boiling range | CHARGE 495–508°F. cut of Ex.1 charge | PRODUCT 495–508°F. boiling range |
| Converted | 78% | | 85% | |
| Reaction Temp. °F. | 140 | | 60 | |
| charge mole ratio olefin | | | | |
| aromatic | 1.2 | | 3.8 | |
| Time (hours) | 2.5 | | 3.0 | |
| $BF_3/H_3PO_4$ mole ratio | 1.7 | | 1.7 | |
| catalyst/reactant weight ratio | 0.4 | | 0.4 | |

*37.4 aromatics; 26.2 olefins + saturates
**19.1 aromatics; 28.6 olefins + saturates
,110

Examples 1 and 2 show products which are the same boiling range as their charge. Both examples show a marked concentration of the 2,6- and 2,7-DMN as opposed to the other naphthalenes of the fraction. The concentrated fraction is now suitable for subsequent treatment to purify the 2,6- and 2,7-DMN and the alkylated by-product boiling in the range of 600°–750°F. can be used as plasticizers for polyvinyl chloride and have excellent compatibility therewith.

EXAMPLE 3

A sample of each of the plasticizers of Examples 1 and 2 and a control PVC plasticizer which was produced by hydrotreating and distilling (455° to >750°F.) aromatic extract from synthetic tower bottoms from catalytic cracking was subjected to 125 hours under a sunlamp then the color measured according to ASTM D-1500. Table III shows the results.

TABLE III

| Sample | Ex. 1 (650–682°F.) | Ex. 2 (600–711°F.) | Control (644–760°F.) |
|---|---|---|---|
| Color ASTM D-1500 | | | |
| Initial | 1.25 | 1.25 | 1.00 |
| 125 hrs. under sunlamp | 2.75 | 2.75* | 7.75 |

*exposure for 120 hours

EXAMPLE 4

A portion of the plasticizer oil of Example 2 and the control oil of Example 3 was blended along with a primary ester (DOP) in polyvinyl chloride. The formula used for mixing with the polyvinyl chloride was as follows.

| | Wt. % |
|---|---|
| PVC | 58.60 |
| Lead Carbonate | 0.95 |
| Stearic Acid | 0.45 |
| Dioctylphthalate (DOP) | 20.00 |
| Plasticizer | 20.00 |
| Total | 100.00 |

The dry ingredients were blended in a ball mill. Plasticizer was added until the mixture was wet. The mixture was put on a mill and milled for five minutes at 290°–310°F., with alternate cutting. Film was sheeted off at 0.080–0.090 inch and molded in a standard tensile mold at 300°F. and 400–500 psig. Samples were tested for heat stability at 300°F. The control oil plasticized PVC was quite brittle after 2–3 hours while the sample containing plasticizer from Example 2 showed no significant embrittlement after six hours. Thin sheets of 0.008–.012 inch were exposed under sunlamps for 24 hours (ASTM D925–55 ). The control oil plasticized PVC was brown compared to cream colored for the PVC containing plasticizer from Example 2.

The results were summarized in Table 4.

Table 4

| Plasticizer | Example 2 | Control |
|---|---|---|
| Heat Stability hours to brittle at 300°F. | 6+ | 3 |
| U. V. Stability 24 hours (ASTM D925–55) Color | cream | brown |

The invention claimed is:

1. A polyvinyl chloride composition comprising a major amount of polyvinyl chloride and a minor amount of a plasticizer composition comprising a fraction boiling within the range of 600° to 750°F. prepared by the process of:
   (a) contacting a cracked gas oil boiling substantially in the range of 400° to 650°F. with a $C_3$ to $C_8$ olefinic material in the presence of an alkylation catalyst and (b) recovering the fraction boiling in the range of 600° to 750°F.

2. A polyvinyl chloride composition according to claim 1 wherein the plasticizer boils within the range of 650° to 720°F.

3. A polyvinyl chloride composition according to claim 1 wherein said $C_3$ to $C_8$ olefinic material is a 50° to 105°F fraction of catalytic gasoline.

4. A polyvinyl chloride composition according to claim 3 wherein said fraction of catalytic gasoline contains at least 60 percent $C_5$ olefins.

5. A polyvinyl chloride composition according to claim 1 wherein said cracked gas oil boiling substantially in the range of 400° to 650°F is a dicyclic aromatic concentrate derived from a cracked gas oil fraction boiling mainly in the range of 440° to 515°F.

6. A polyvinyl chloride composition according to claim 5 wherein said concentrate is derived by furfural extraction of said cracked gas oil fraction boiling mainly in the range of 440° to 515°F.

7. A polyvinyl chloride composition according to claim 6 wherein said plasticizer composition comprises alkylated dimethylnaphthalenes.

8. A polyvinyl chloride composition according to claim 7 wherein the alkylated dimethylnaphthalene contains at least one alkyl group in the $C_3$ to $C_8$ range.

9. A polyvinyl chloride composition according to claim 8 wherein at least one said alkyl group is isobutyl.

10. A polyvinyl chloride composition according to claim 8 wherein the alkyl group other than methyl of said alkylated dimethylnaphthalene consists of $C_4$ alkyl.

11. A polyvinyl chloride composition according to claim 1 wherein said composition has a lower ASTM D-1500 color after 125 hours of exposure under a sunlamp than does a control composition after said exposure, wherein said control composition contains a plasticizer produced by distilling, in the range of 455° to at least 750°F, a hydrotreated aromatic extract from synthetic tower bottoms from catalytic cracking of gas oil.

12. A polyvinyl chloride composition according to claim 11 wherein said composition and said control composition contain an ester plasticizer.

13. A polyvinyl chloride composition according to claim 12 wherein said ester plasticizer is dioctylphthalate and wherein after exposure to a temperature of 300°F for at least three hours said control composition is more brittle than said composition after the same exposure to heat.

* * * * *